US012769882B2

(12) United States Patent
Yoon et al.

(10) Patent No.: US 12,769,882 B2
(45) Date of Patent: Oct. 20, 2026

(54) ON DEVICE-BASED SYSTEM AND METHOD FOR SUPPRESSING LEAKAGE OF PERSONAL INFORMATION AND FOR PROVIDING PERSONALIZED RESPONSE

(71) Applicant: SEOUL NATIONAL UNIVERSITY R&DB FOUNDATION, Seoul (KR)

(72) Inventors: Sung Roh Yoon, Seoul (KR); Sang Won Yu, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 61 days.

(21) Appl. No.: 18/956,157

(22) Filed: Nov. 22, 2024

(65) Prior Publication Data

US 2025/0086318 A1 Mar. 13, 2025

Related U.S. Application Data

(63) Continuation of application No. PCT/KR2023/015681, filed on Oct. 12, 2023.

(30) Foreign Application Priority Data

Aug. 23, 2023 (KR) ........................ 10-2023-0110201

(51) Int. Cl.
*G06F 21/62* (2013.01)
*G06F 40/295* (2020.01)

(52) U.S. Cl.
CPC ........ *G06F 21/6254* (2013.01); *G06F 40/295* (2020.01)

(58) Field of Classification Search
None
See application file for complete search history.

(56) References Cited

U.S. PATENT DOCUMENTS

| | | | | |
|---|---|---|---|---|
| 10,169,315 | B1 * | 1/2019 | Heckel | G06F 40/166 |
| 2021/0192078 | A1 * | 6/2021 | Cosman | G06V 10/82 |

FOREIGN PATENT DOCUMENTS

| | | | |
|---|---|---|---|
| JP | 2018-011262 | A | 1/2018 |
| JP | 2020-004048 | A | 1/2020 |
| JP | 2022-149064 | A | 10/2022 |
| JP | 2023-527670 | A | 6/2023 |
| KR | 10-2011-0022104 | A | 3/2011 |
| KR | 10-1930062 | B1 | 3/2019 |
| KR | 10-1963641 | B1 | 4/2019 |
| KR | 10-2313561 | B1 | 10/2021 |

OTHER PUBLICATIONS

Examiner, "International Search Report of PCT/KR2023/015681", Oct. 12, 2023.

* cited by examiner

*Primary Examiner* — Brandon Hoffman
(74) *Attorney, Agent, or Firm* — Bridgeway IP Law Group, PLLC; Jihun Kim

(57) ABSTRACT

According to an embodiment, an on device-based system for suppressing the leakage of personal information and for providing personalized response includes: a plurality of user devices configured to detect Personal Identifiable Information (PII) from a user query and transmit a user-neutral query which is obtained by converting the PII into neutral information; and a management server configured to receive the user-neutral query and train a management language model that generates a common response pattern for each neutral query pattern.

10 Claims, 7 Drawing Sheets

| TAG | MEANING |
| --- | --- |
| CARDINAL | CARDINAL VALUE |
| DATE | DATE VALUE |
| EVENT | EVENT NAME |
| FAC | BUILDING NAME |
| GPE | GEOPOLITICAL ENTITY |
| LANGUAGE | LANGUAGE NAME |
| LAW | LAW NAME |
| LOC | LOCATION NAME |
| MONEY | CURRENCY NAME |
| NORP | AFFILIATION |
| ORDINAL | ORDINAL VALUE |
| ORG | ORGANIZATION NAME |
| PERCENT | PERCENT VALUE |
| PERSON | PERSON NAME |
| PRODUCT | PRODUCT NAME |
| QUANTITY | QUANTITY VALUE |
| TIME | TIME VALUE |
| WORK OF ART | TITLE OF WORK OF ART |
| PHONE NUMBER | PERSONAL PHONE NUMBER |
| EMAIL ADDRESS | PERSONAL EMAIL ADDRESS |
| URL | PERSONAL URL |

FIG. 3

ON DEVICE-BASED SYSTEM AND METHOD FOR SUPPRESSING LEAKAGE OF PERSONAL INFORMATION AND FOR PROVIDING PERSONALIZED RESPONSE

CROSS-REFERENCE TO RELATED APPLICATION

This application is a Continuation of International Application No. PCT/KR2023/015681, filed on Oct. 12, 2023, which claims priority of Korean Patent Application No. 10-2023-0110201 filed in the Korean Intellectual Property Office on Aug. 23, 2023, the entire contents of which are incorporated herein by reference.

TECHNICAL FIELD

The technical field of the present disclosure relates to an on device-based system and method for suppressing the leakage of personal information and for providing personalized response.

BACKGROUND

Recently, with the growing interest in generative conversational artificial intelligence (AI), such as ChatGPT, concerns have emerged about the leakage of Personal Identifiable Information (hereinafter, referred to as "PII") and the lack of user-customized functions.

In the case of conventional smartphones, only a minimal amount of PII, such as fingerprint or facial recognition data, is processed within a user device and not transmitted to a management server. However, with the recent emergence of generative conversational AI, the amount of PII that needs to be stored is much larger, and there has been emergence of a model, like ChatGPT, capable of making a response to a query in the form of text and a response to a query in the form of image or video with a much larger amount of data. As a user continues to use his/her personal device over a long period of time, the accumulation of data increases. Thus, a conventional method where only a small portion of PII is managed on the device has limitations.

Meanwhile, personalization of conversational AI is needed to provide a user-customized response, but needs to be complemented by a technique to suppress the leakage of PII.

Therefore, the present disclosure proposes an AI agent that operates on a user device, such as a smartphone, without transmitting PII to a management server, such as a cloud.

DISCLOSURE OF THE INVENTION

Problems to be Solved by the Invention

In view of the foregoing, the present disclosure is conceived to provide an on device-based system and method for suppressing the leakage of personal information and for providing personalized response where PII exists only on a user device and is not leaked to the outside, and a user-customized response is generated through a program within the user device.

The problems to be solved by the present disclosure are not limited to the above-described problems. There may be other problems to be solved by the present disclosure.

Means for Solving the Problems

A first aspect of the present disclosure provides an on device-based system for suppressing the leakage of personal information and for providing personalized response, including: a plurality of user devices configured to detect Personal Identifiable Information (PII) from a user query and transmit a user-neutral query which is obtained by converting the PII into neutral information; and a management server configured to receive the user-neutral query and train a management language model that generates a common response pattern for each neutral query pattern.

A second aspect of the present disclosure provides an on device-based user device for suppressing the leakage of personal information and for providing personalized response, including: a communication module; a memory that stores a personalized response program; and a processor that executes the personalized response program, and the personalized response program detects PII from a user query, converts the PII into neutral information, and transmits a user-neutral query converted as the neutral information to a management server.

A third aspect of the present disclosure provides a personalized response method that is performed by an on device-based user device for suppressing the leakage of personal information and for providing personalized response, including: (a) a process of receiving, by a management server, a user-neutral query, which is obtained by converting PII contained in a user query into neutral information, from a plurality of user devices; and (b) a process of training, by the management server, a management language model that generates a common response pattern for each neutral query pattern.

Effects of the Invention

According to an embodiment of the present disclosure, PII exists only on a user device and is not leaked to the outside, and a personalized response is generated through a program within the user device. Also, according to the present disclosure, it is possible to provide a user-customized AI query-response service.

BRIEF DESCRIPTION OF THE DRAWINGS

FIG. 3 shows examples of PII according to an embodiment of the present disclosure.

BEST MODE FOR CARRYING OUT THE INVENTION

Figure 1:
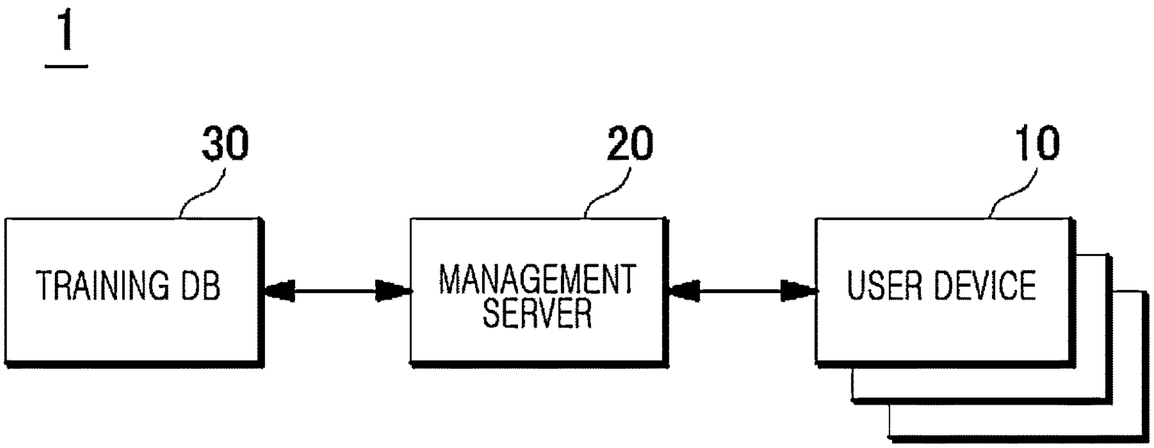
FIG. 1 is a configuration view of an on device-based system for suppressing the leakage of personal information and for providing personalized response according to an embodiment of the present disclosure.

Hereafter, embodiments will be described in detail with reference to the accompanying drawings so that the present disclosure may be readily implemented by a person with ordinary skill in the art. However, it is to be noted that the present disclosure is not limited to the embodiments but can be embodied in various other ways. In the drawings, parts irrelevant to the description are omitted for the simplicity of explanation, and like reference numerals denote like parts throughout the whole document.

Throughout this document, the term “connected to” may be used to designate a connection or coupling of one element to another element and includes both an element being “directly connected to” another element and an element being “electronically connected to” another element via another element. Further, the term “comprises or includes” and/or “comprising or including” used in the document means that one or more other components, steps, operation and/or existence or addition of elements are not excluded in addition to the described components, steps, operation and/or elements unless context dictates otherwise.

Throughout the whole document, the term “unit” includes a unit implemented by hardware or software and a unit implemented by both of them. One unit may be implemented by two or more pieces of hardware, and two or more units may be implemented by one piece of hardware. However, the “unit” is not limited to the software or the hardware and may be stored in an addressable storage medium or may be configured to implement one or more processors. Accordingly, the “unit” may include, for example, software, object-oriented software, classes, tasks, processes, functions, attributes, procedures, sub-routines, segments of program codes, drivers, firmware, micro codes, circuits, data, database, data structures, tables, arrays, variables and the like. The components and functions provided by the “unit” may be either combined into a smaller number of components and “units” or divided into a larger number of components and “units”. Moreover, the components and “units” may be implemented to reproduce one or more CPUs within a device.

The term “network” refers to a connection structure that enables information exchange between nodes such as devices, servers, etc. and includes LAN (Local Area Network), WAN (Wide Area Network), Internet (WWW: World Wide Web), a wired or wireless data communication network, a telecommunication network, a wired or wireless television network, and the like. Examples of the wireless data communication network may include 3G, 4G, 5G, 3GPP (3rd Generation Partnership Project), LTE (Long Term Evolution), WIMAX (World Interoperability for Microwave Access), Wi-Fi, Bluetooth communication, infrared communication, ultrasonic communication, VLC (Visible Light Communication), LiFi, and the like, but may not be limited thereto.

Figure 2:
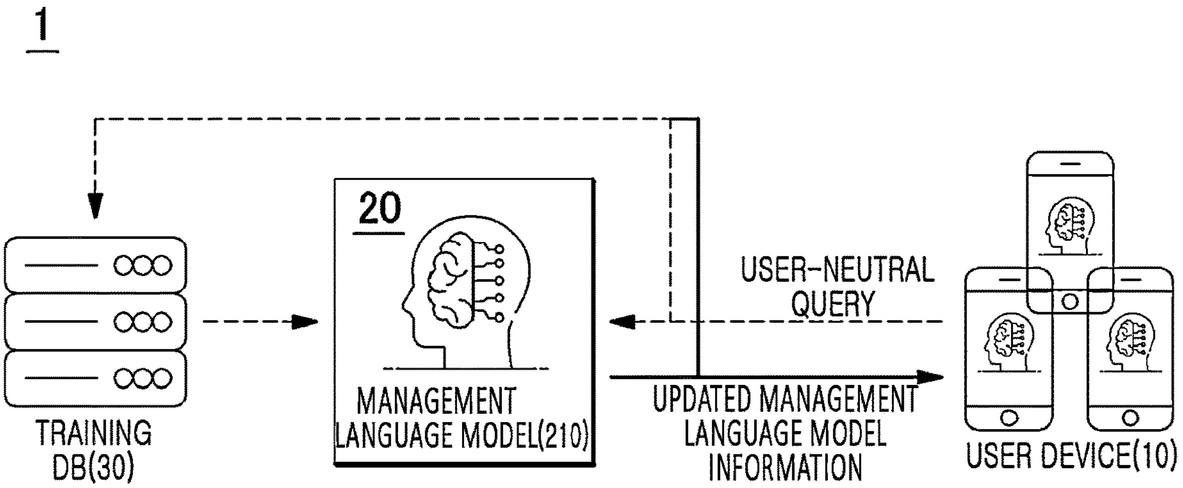
FIG. 2 is a diagram illustrating the on device-based system for suppressing the leakage of personal information and for providing personalized response according to an embodiment of the present disclosure.

FIG. 1 is a configuration view of an on device-based system for suppressing the leakage of personal information and for providing personalized response according to an embodiment of the present disclosure, and FIG. 2 is a diagram illustrating the on device-based system for suppressing the leakage of personal information and for providing personalized response according to an embodiment of the present disclosure.

Referring to FIG. 1, a personalized response system 1 may include a plurality of user devices 10, a management server 20, and a database 30.

Referring to FIG. 2, the user device 10 may detect Personal Identifiable Information (PII) from a user query and transmit a user-neutral query, which is obtained by converting the PII into neutral information, to the management server 20. Herein, the PII includes resident registration number, name, email address, or various types of information which can be used to identify a specific individual.

The management server 20 may receive the user-neutral query from the plurality of user devices 10 and train a management language model 210 that generates a common response pattern for each neutral query pattern.

The database 30 may store or provide user-neutral query and response data, which is generated in interaction between the management server 20 and the user device 10, as training data. For example, the training data managed by the database 30 may be used for federated learning to collaboratively train a model without sharing data distributed across various locations.

The management server 20 may be implemented with computers or portable devices which can access a network. Herein, the computers may include, for example, a notebook, a desktop, and a laptop. The portable devices are, for example, wireless communication devices that ensure portability and mobility and may include all kinds of handheld-based wireless communication devices such as various smart phones, tablet PCs, and smart watches.

Also, the management server 20 may provide the user device 10 with a management language model, which has been trained based on the user-neutral query. Herein, the management server 20 may operate in a cloud computing service model, such as software as a service (SaaS), platform as a service (PaaS), or infrastructure as a service (IaaS), and may be built in the form of a private cloud, a public cloud, or a hybrid cloud.

Specifically, the management server 20 includes a communication module, a memory, and a processor. The communication module provides a communication interface necessary to provide a signal transmitted to and received from the user device 10 in the form of packet data in conjunction with a communication network. Herein, the communication module may be a device including hardware and software necessary for transmitting and receiving a signal, such as a control signal or a data signal, through wired/wireless connection with other network devices.

The memory stores a personalized response program. Also, the memory performs a function of temporarily or permanently storing data processed by the processor. Herein, the memory may include a volatile storage medium or a non-volatile storage medium, but the scope of the present disclosure is not limited thereto.

The memory may store a separate program such as an operating system for processing and controlling the processor, and may perform a function of temporarily storing input or output data.

The memory may include at least one type of storage medium of a flash memory type, a hard disk type, a multimedia card micro type, a card-type memory (for example, SD, XD memory, or the like), a RAM, and a ROM.

The processor executes the personalized response program, and provides a function of controlling hardware of a device according to the execution of the program. That is, the processor may perform a hardware control function, such as a file system, a memory allocation, a network, a basic library, a timer, a device control (display, media, input device, 3D, or the like), and other utilities, required as the program is executed.

Herein, the processor may include all kinds of devices capable of processing data. Herein, the term "processor" may refer to, for example, a data processing device embedded in hardware having a physically structured circuit to perform a function expressed as a code or an instruction included in a program. An example of the data processing device embedded in the hardware as described above includes a processing device, such as a microprocessor, a central processing unit (CPU), a processor core, a multiprocessor, an application-specific integrated circuit (ASIC), or a field programmable gate array (FPGA), but the scope of the present disclosure is not limited thereto.

The personalized response program according to an embodiment of the present disclosure may generate a common response pattern for each neutral query pattern by inputting the user-neutral query received from the plurality of user devices 10 to the management language model 210. For example, the management language model 210 may be updated through federated continual learning, and may derive a common response pattern useful to a plurality of users. Then, the update information of the management language model 210 may be transmitted to each of the user devices 10 and used to update the response generation model 132 by each of the user devices 10.

For example, the management language model 210 may extract sentence structure elements, such as words, phrases, and clauses, from the user-neutral query, classify these elements into predetermined neutral query patterns, and match the neutral query patterns to a corresponding common response pattern for learning. For example, the neutral query patterns may be classified by context based on a linguistic distribution of word frequencies and types in the user-neutral query.

The management language model 210 may be trained with PII patterns for respective neutral query patterns by using the location of neutral information within a sentence structure of the user-neutral query. In this case, the neutral information refers to information obtained by converting PII included in the user query into a representative neutral word or <MASK>. This will be described in detail with reference to a PII detection model. Also, the location of the neutral information may be determined by identifying the location of the neutral word or <MASK> token.

For example, each user device 10 may generate various patterns including PII from the user query during chat conversations. For example, a first user may generate a pattern (first PII pattern) including PII at a location A from a neutral query pattern of a sentence structure "A B C". As another example, a second user may generate a pattern (second PII pattern) including PII at a location C from the neutral query pattern of the sentence structure "A B C". In other words, whether the same word is considered to be PII of each user may vary depending on situations of the users. For example, "Google" may be a simple word entity for the first user, but can be PII as workplace information for the second user.

Therefore, the management server 20 may determine at which and in what context the PII has been converted into neutral information for each neutral query pattern received from the plurality of user devices 10.

FIG. 3 shows examples of PII according to an embodiment of the present disclosure.

Referring to FIG. 3, the PII may be classified into direct identifiers and quasi-identifiers to identify a specific individual. For example, the direct identifiers refer to information that can directly identify a specific individual just with a PII dataset. Examples of the direct identifiers may include name, resident registration number, home address, phone number, email address, and the like. The quasi-identifiers refer to information that can indirectly identify a specific individual when combined with other quasi-identifiers. Examples of the quasi-identifiers may include age, gender, political orientation, religion, and habits. A method for detecting the PII will be described with reference to FIG. 5 to FIG. 7.

Figure 4:
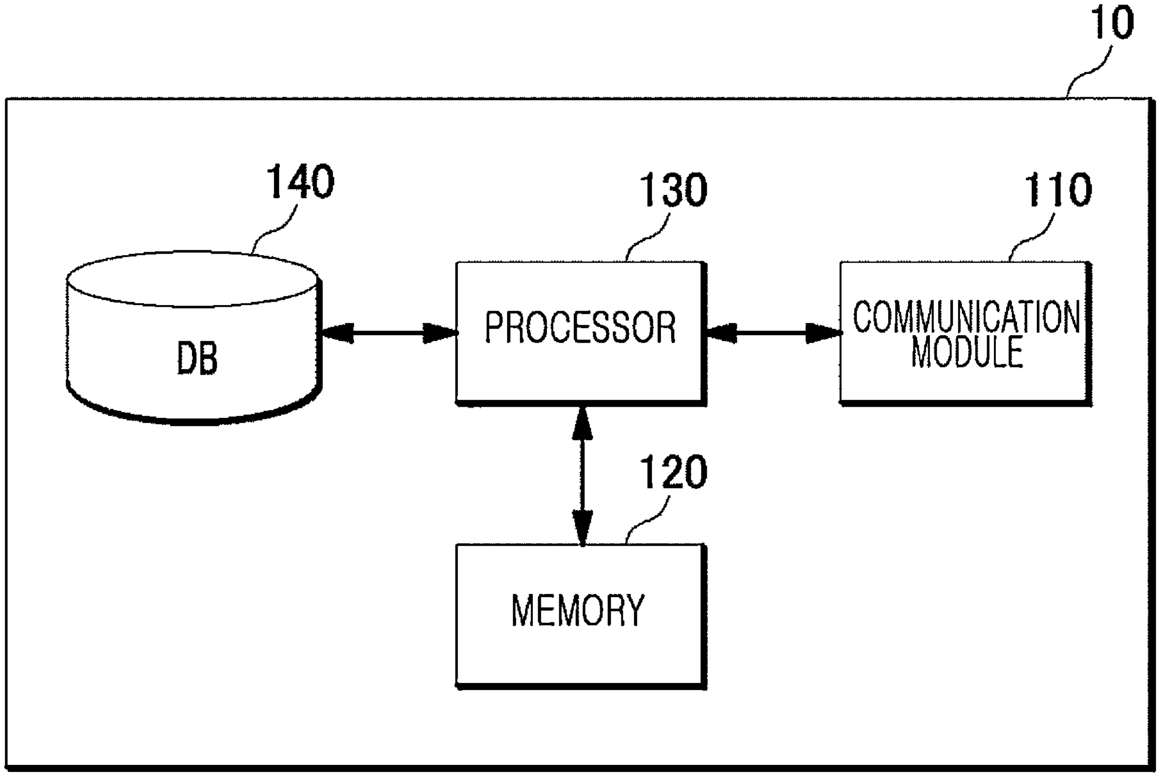
FIG. 4 is a configuration view of an on device-based user device for suppressing the leakage of personal information and for providing personalized response according to another embodiment of the present disclosure.
Figure 5:
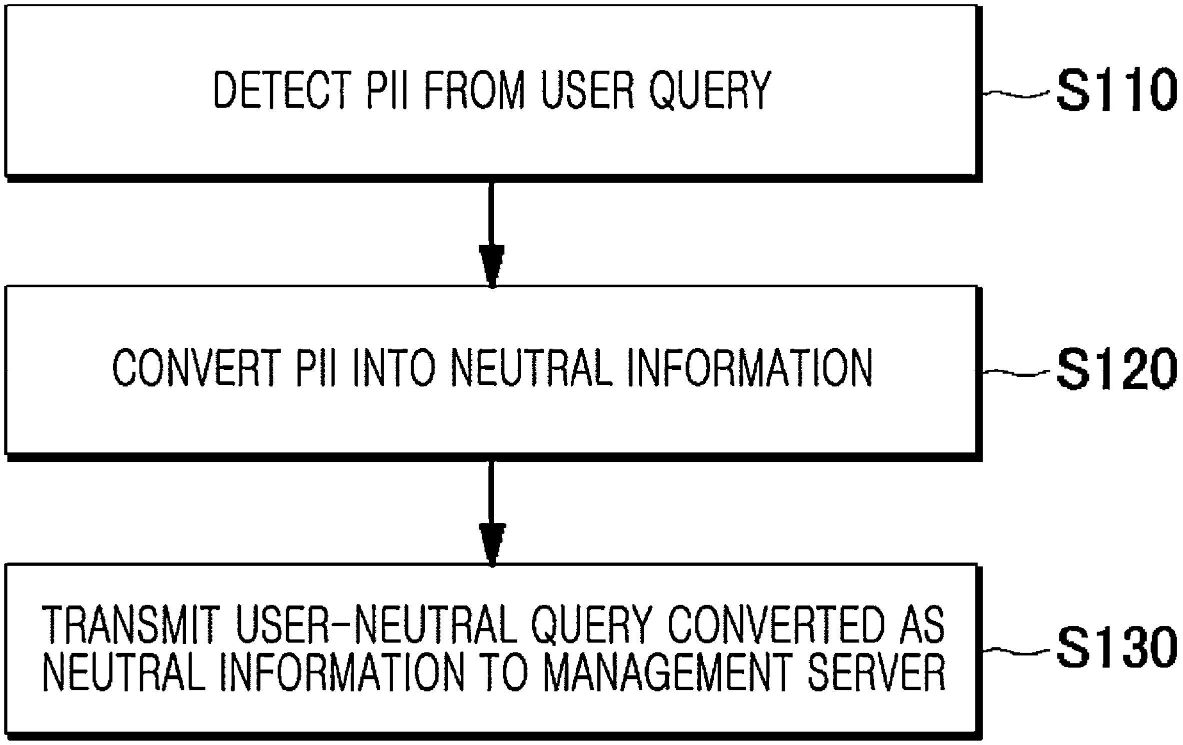
FIG. 5 is a flowchart showing a method for suppressing the leakage of personal information and for providing personalized response that is performed by the user device according to another embodiment of the present disclosure.
Figure 6:
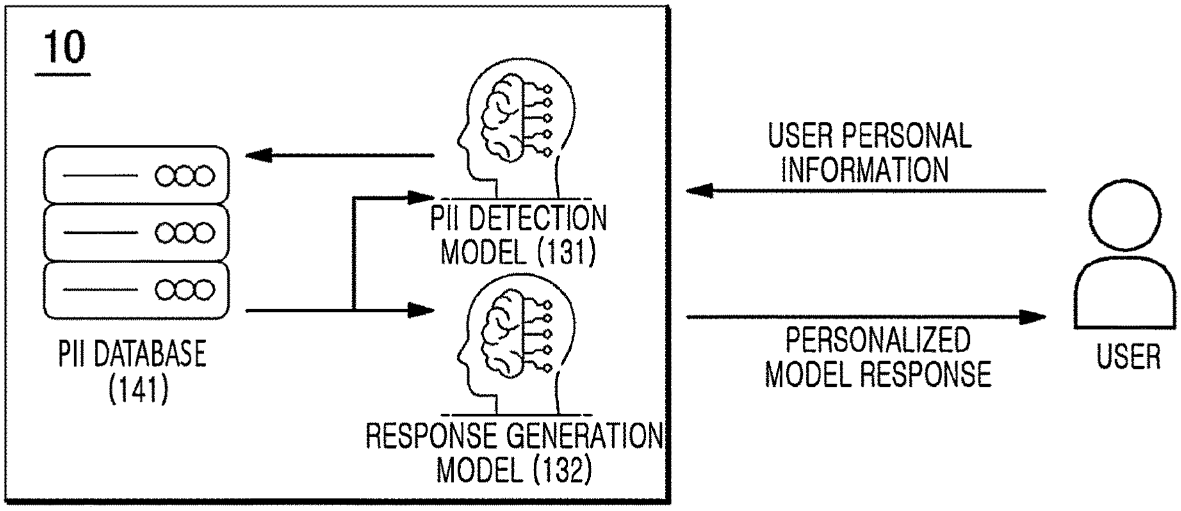
FIG. 6 is a diagram illustrating a personalized response program that is executed by the user device according to another embodiment of the present disclosure.
Figure 7:
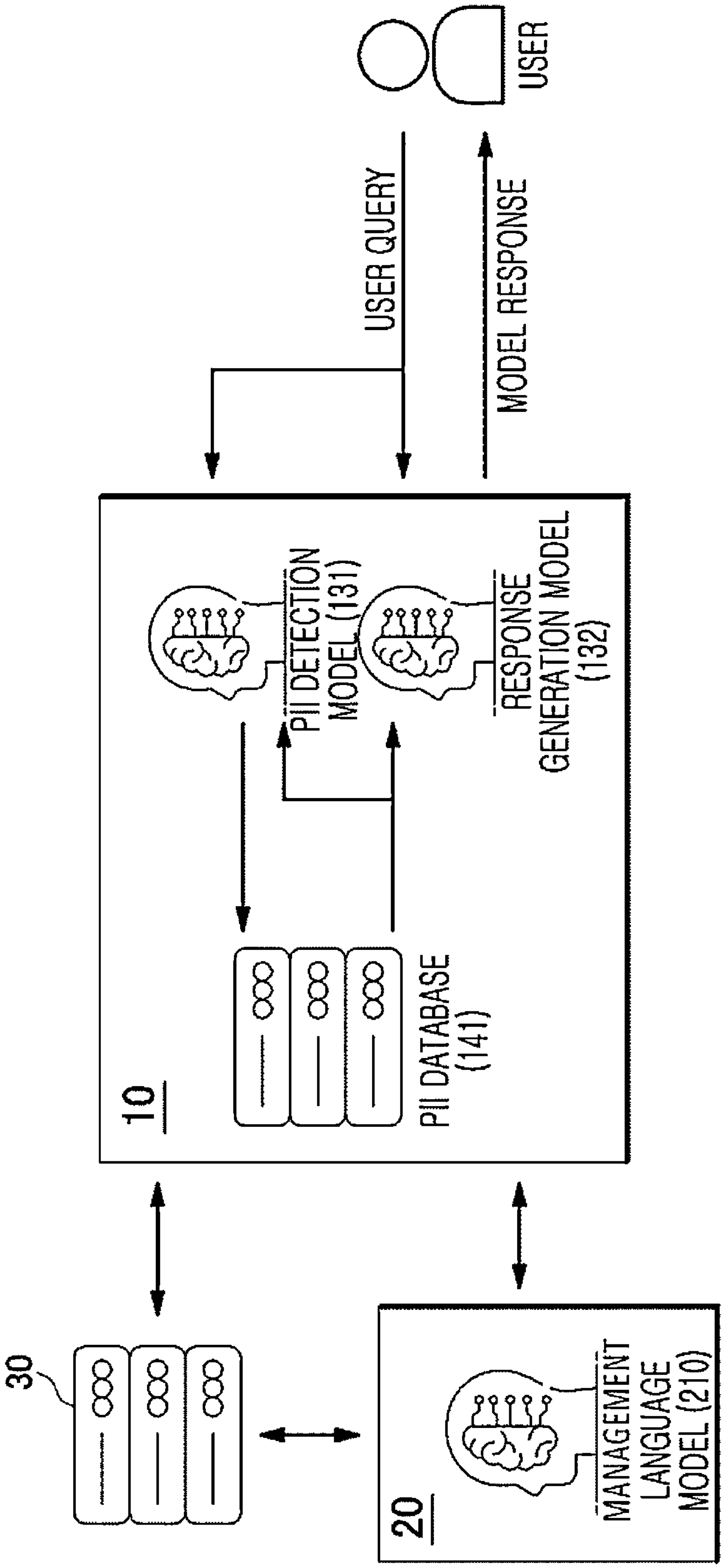
FIG. 7 is a diagram illustrating data interaction between a management server and the user device according to another embodiment of the present disclosure.

FIG. 4 is a configuration view of an on device-based user device for suppressing the leakage of personal information and for providing personalized response according to another embodiment of the present disclosure, FIG. 5 is a flowchart showing a method for suppressing the leakage of personal information and for providing personalized response that is performed by the user device according to another embodiment of the present disclosure, FIG. 6 is a diagram illustrating a personalized response program that is executed by the user device according to another embodiment of the present disclosure, and FIG. 7 is a diagram illustrating data interaction between a management server and the user device according to another embodiment of the present disclosure.

Referring to FIG. 4, the user device 10 may include a communication module 110, a memory 120, a processor 130, and a database 140.

The communication module 110 may receive updated management language model information from the management server 20 and transmit the updated management language model information to the processor 130. Herein, the communication module 110 may be a device including hardware and software necessary for transmitting and receiving a signal, such as a control signal or a data signal, through wired/wireless connection with other network devices.

The memory 120 may store the personalized response program. The personalized response program detects PII from a user query, converts the PII into neutral information, and transmits a user-neutral query converted as the neutral information to a management server. Herein, the memory 120 may include a magnetic storage medium or a flash storage medium as well as a volatile storage device that requires power to retain information stored therein, but the scope of the present disclosure is not limited thereto.

The memory 120 may store a separate program such as an operating system for processing and controlling the processor 130, and may perform a function of temporarily storing input or output data.

The processor 130 executes a personalized response program (hereinafter, referred to as "program") stored in the memory 120, and provides a function of controlling hardware of the user device 10 according to the execution of the program. That is, the processor 130 may perform a hardware control function, such as a file system, a memory allocation, a network, a basic library, a timer, a device control (display, media, input device, 3D, or the like), and other utilities, required as the program is executed.

Referring to FIG. 5, the processor 130 detects PII from a user query (S110), converts the PII into neutral information (S120), and transmits a user-neutral query converted as the neutral information to the management server 20 (S130).

Herein, the processor 130 may include all kinds of devices capable of processing data. The processor 130 may refer to, for example, a data processing device embedded in hardware having a physically structured circuit to perform a function expressed as a code or an instruction included in a program. An example of the data processing device embedded in the hardware as described above includes a processing device, such as a microprocessor, a central processing unit (CPU), a processor core, a multiprocessor, an application-specific integrated circuit (ASIC), or a field programmable gate array (FPGA), but the scope of the present disclosure is not limited thereto.

The database 140 stores or provides data required for the user device 10 under the control of the processor 130. For example, the database 140 may include a PII database 141. Referring to FIG. 6, a PII database 141 may store the PII extracted from the user query. The database 140 may be included as a component separate from the memory 120 or may be built in a partial region of the memory 120.

Referring to FIG. 6, the processor 130 may include detailed modules that perform various functions according to the execution of the personalized response program. Herein, the detailed modules include a PII detection model 131 and a response generation model 132.

Referring to FIG. 7, when the user device 10 receives update information of the management language model 210 from the management server 20, it may update the response generation model 132 or the PII detection model 131. For example, the PII detection model 131 and the response generation model 132 may perform continual learning to update with new datasets and environments while maintaining the performance of the pre-trained model.

For example, the PII detection model 131 may use a conventional language recognition model and may be composed of an encoder structure. Likewise, the response generation model 132 may use a conventional language generation model and may be composed of a decoder or encoder-decoder structure. For example, each model may apply various components, such as a transformer model and a convolutional neural network (CNN) or a recurrent neural network (RNN), as basic components.

Referring to FIG. 7, the PII detection model 131 may detect PII from a user query, convert the PII into neutral information, and transmit a user-neutral query converted as the neutral information to the management server 20. Herein, the PII detection model 131 may generate the user-neutral query in which the PII has been filtered out by masking the PII extracted from the user query or converting the extracted PII into predetermined words.

For example, when the PII detection model 131 converts PII into neutral information, it can specify a representative neutral word for each entity type classified as PII from a user query and convert the PII into corresponding text. For example, a query "My name is Sangwon Yoo. What's your name?" can be converted into a neutral query "My name is Gil-dong Hong. What's your name?" Alternatively, the PII detection model 131 can convert the query by simply masking the PII extracted from the user query with a <MASK> token. For example, the query "My name is Sangwon Yoo. What's your name?" can be converted into a neutral query "My name is <MASK>. What's your name?".

Thus, the management server 20 may train the management language model 210 with user-neutral query data in which the PII has been filtered out and provide a common response for each neutral query pattern.

As another example, the management server 20 may be trained with PII patterns of respective users while learning neutral query patterns of a plurality of users. In this case, the PII patterns can be learned for the respective query patterns based on the location of the neutral word or <MASK> token in the sentence structure as described above. In an embodiment, the management server 20 may provide a first user device with a PII pattern of a second user device as update information. For example, the first user has PII at a location A in a first user query "A B C", the second user has PII at a location C, and, thus, the management server 20 may provide the first user device with information, which indicates that PII can be included at the both locations A and C in the query structure, as update information. Later, the first user device may input the first user query similar to the PII pattern of the second user device by a different method from its original method. In this case, the updated PII detection model 131 of the first user device can easily recognize PII in the first user query. As a result, each user device 10 can enhance the PII filtering function of the PII detection model 131. Herein, PII of the other users is not updated, but a pattern including PII is updated, and, thus, it is possible to suppress the leakage of personal information.

For example, the PII detection model 131 may determine whether entities including letters or words and composing a user query are personal information based on initial PII stored in the PII database 141, extract PII from the user query based on Named Entity Recognition (NER), and store the extracted PII in the PII database 141. For example, a process of constructing the PII database 141 needs to be performed beforehand, and some of the entities classified as common PII may be extracted from the user query as initial PII through text recognition methodologies, such as NER, or the user may directly register the initial PII to construct the PII database 141. Further, the PII detection model 131 may determine whether entities in newly inputted user query text are PII based on the PII database 141 and thus can expand the PII database 141 and improve accuracy in PII detection.

For example, the PII detection model 131 may recognize the PII pattern through continual learning based on the PII database 141 updated by the user query or use behavior. Therefore, the PII detection model 131 may determine whether the user query contains PII and transmit a user-neutral query, which is obtained by removing the PII from the user query, to the management server 20. That is, the PII database 141 is used as training data for the PII detection model 131, and, thus, the PII detection model 131 can detect text entities related to the PII database 141 and increase its generalization capabilities for PII detection. In this case, a loss function typically used for training a language encoder model may be applied. For example, a negative log likelihood (NLL) function may be applied as a loss function in a Masked Language Modeling (MLM) training method.

The response generation model 132 may identify the context of the user query through natural language processing analysis and generate a response. Also, the response generation model 132 may be configured as a language model that is trained with a user query pattern based on the user query. In this case, the user query pattern may be learned for the same context based on a linguistic distribution of word frequencies and types in the user query.

For example, the response generation model 132 can use a collection of user queries in the form of natural language text as training data. As user query data accumulates, the training data can be continuously updated. This enables the response generation model 132 to be trained with a user query pattern based on the accumulated user queries and each user device 10 to provide a personalized and natural response to each user.

For example, the response generation model 132 may be trained to ensure that the distribution of languages created by the model in the initial state becomes closer to the distribution of query languages input by the user. Also, a loss function configured to measure the distance between distributions can be applied to narrow the gap between the distribution of text composed of user query data and the distribution of text data generated by the response generation model 132. To suppress catastrophic forgetting during continual learning of continuously updated user query data, the response generation model 132 may further apply a loss function configured to reduce the distance between the generating distribution of the pre-trained model and the generating distribution of the post-trained model whenever the response generation model 132 is trained with data. For example, cross-entropy may be applied as a loss function configured to measure the difference between distributions.

In another embodiment, when the management server 20 and the user device 10 have the same service operator or are in collaboration with each other in the on device-based system for suppressing the leakage of personal information and for providing personalized response, the management server 20 may provide federated learning of the management language model 210 and update information of each model to the user device 10. That is, the management server 20 may interact with each user device 10 to exchange training data with each user device 10.

In an additional embodiment, when the management server 20 and the user device 10 do not have the same service operator and thus do not have mutual access rights, the user device 10 can only transmit a neutral query to the management server 20 and receive a common response to the neutral query. That is, each user device 10 may use user query data to provide a personalized response service to the trained response generation model 132. In this case, the management server 20 serves as a third party and thus can only provide a common response through the management language model 210 when a response is made to the user device 10.

Hereafter, descriptions of the same configurations among the configurations illustrated in FIG. 1 to FIG. 7 are omitted.

Figure 8:
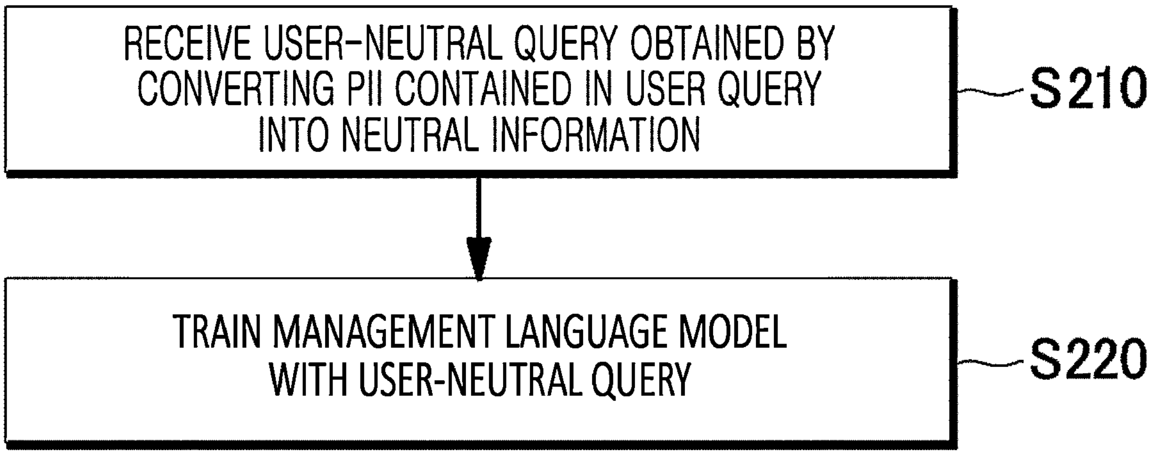
FIG. 8 is a flowchart showing a personalized response method that is performed by the on device-based system for suppressing the leakage of personal information and for providing personalized response according to yet another embodiment of the present disclosure.

FIG. 8 is a flowchart showing a personalized response method that is performed by the on device-based system for suppressing the leakage of personal information and for providing personalized response according to yet another embodiment of the present disclosure.

Referring to FIG. 8, the personalized response method that is performed by the on device-based system 1 for suppressing the leakage of personal information and for providing personalized response includes: a process of receiving, by the management server 20, a user-neutral query, which is obtained by converting PII contained in a user query into neutral information, from the plurality of user devices 10 (S210); and (b) a process of training, by the management server 20, the management language model 210 that generates a common response pattern for each neutral query pattern (S220).

Herein, the management language model 210 may be trained with PII patterns for respective neutral query patterns by using the location of neutral information within a sentence structure of the user-neutral query.

The personalized response method according to an embodiment of the present disclosure can be embodied in a storage medium including instruction codes executable by a computer such as a program module executed by the computer. A computer-readable medium can be any usable medium which can be accessed by the computer and includes all volatile/non-volatile and removable/non-removable media. Further, the computer-readable medium may include all computer storage media. The computer storage media include all volatile/non-volatile and removable/non-removable media embodied by a certain method or technology for storing information, such as computer-readable instruction code, a data structure, a program module or other data.

The apparatus and method of the present disclosure have been explained in relation to a specific embodiment, but their components or a part or all of their operations can be embodied by using a computer system having general-purpose hardware architecture.

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

What is claimed is:

1. An on-device system for suppressing a leakage of personal information and for providing a personalized response, comprising:

a plurality of user devices configured to execute a local Personal Identifiable Information (PII) detection model to detect a PII from a user query, locally convert the PII into neutral information by replacing detected PII entities with neutral tokens based on Named Entity Recognition (NER), and transmit a user-neutral query comprising a linguistic distribution of the neutral tokens; and a management server configured to receive the user-neutral query and train a management language model using federated continual learning that generates a common response pattern for each neutral query pattern, wherein the management server updates the management language model by identifying locations of the neutral tokens within a sentence structure of the user-neutral query to derive common response patterns without ever receiving or storing raw PII from the plurality of user devices.

2. The system of claim 1, wherein each of the plurality of user devices includes:

a response generation model configured to identify a context of the user query through natural language processing analysis and generate a response; and a PII detection model configured to generate the user-neutral query by masking the PII extracted from the user query or converting the extracted PII into predetermined words.

3. The system of claim 2, wherein the response generation model is configured as a language model that is trained with a user query pattern based on the user query, and the user query pattern is learned for same context based on a linguistic distribution of word frequencies and types in the user query.

4. The system of claim 2, wherein the PII detection model determines whether entities including letters or words and composing the user query are personal information based on initial PII stored in a PII database, extracts the PII from the user query based on the NER, and stores the extracted PII in the PII database.

5. The system of claim 1, wherein the PII is classified into direct identifiers and quasi-identifiers to identify a specific individual.

6. An on device-based user device for suppressing a leakage of personal information and for providing a personalized response, comprising:

a communication module;

a memory to store a personalized response program; and a processor to execute the personalized response program to:

detect a PII from a user query;

locally convert the PII into neutral information by replacing detected PII entities with neutral tokens based on Named Entity Recognition (NER); and transmit a user-neutral query comprising a linguistic distribution of the neutral tokens to a management server, wherein the management server is configured to receive the user-neutral query and train a management language model using federated continual learning that generates a common response pattern for each neutral query pattern, and wherein the management server updates the management language model by identifying locations of the neutral tokens within a sentence structure of the user-neutral query to derive common response patterns without ever receiving or storing raw PII from a plurality of user devices.

7. The user device of claim 6, wherein the personalized response program includes:

a response generation model configured to identify a context of the user query through natural language processing analysis and generate a response; and a PII detection model configured to generate the user-neutral query by masking the PII extracted from the user query or converting the extracted PII into predetermined words.

8. The user device of claim 7, wherein the response generation model is configured as a language model that is trained with a user query pattern based on the user query, and the user query pattern is learned for same context based on a linguistic distribution of word frequencies and types in the user query.

9. The user device of claim 7, wherein the PII detection model determines whether entities including letters or words and composing the user query are personal information based on initial PII stored in a PII database, extracts the PII from the user query based on the NER, and stores the extracted PII in the PII database.

10. A personalized response method that is performed by an on device-based user device for suppressing a leakage of personal information and for providing a personalized response, comprising:

(a) receiving, by a management server, a user-neutral query, which is obtained by converting PII contained in a user query into neutral information from a plurality of user devices, wherein the plurality of user devices execute a local Personal Identifiable Information (PII) detection model to detect the PII from the user query, locally convert the PII into the neutral information by replacing detected PII entities with neutral tokens based on Named Entity Recognition (NER), and transmit a user-neutral query comprising a linguistic distribution of the neutral tokens to the management server; and (b) training, by the management server, a management language model using federated continual learning that generates a common response pattern for each neutral query pattern, wherein the management server updates the management language model by identifying locations of the neutral tokens within a sentence structure of the user-neutral query to derive common response patterns without ever receiving or storing raw PII from the plurality of user devices.

* * * * *